(12) United States Patent
Sakamoto

(10) Patent No.: US 8,556,759 B2
(45) Date of Patent: Oct. 15, 2013

(54) HYDRAULIC PRESSURE CONTROL APPARATUS FOR AUTOMATIC TRANSMISSION

(75) Inventor: Osamu Sakamoto, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 536 days.

(21) Appl. No.: 12/893,360

(22) Filed: Sep. 29, 2010

(65) Prior Publication Data

US 2011/0083524 A1  Apr. 14, 2011

(30) Foreign Application Priority Data

Oct. 14, 2009 (JP) .................................. 2009-237254

(51) Int. Cl.
*F16H 31/00* (2006.01)

(52) U.S. Cl.
USPC ........................................................ 475/116

(58) Field of Classification Search
USPC ........................................ 475/116, 127, 131
See application file for complete search history.

(56) References Cited

U.S. PATENT DOCUMENTS

| | | | | |
|---|---|---|---|---|
| 4,765,202 | A * | 8/1988 | Hayasaki | 477/119 |
| 6,494,803 | B2 | 12/2002 | Suzuki et al. | |
| 2007/0167267 | A1 * | 7/2007 | Long et al. | 475/116 |
| 2007/0225101 | A1 * | 9/2007 | Takagi | 475/116 |
| 2007/0281816 | A1 * | 12/2007 | Long et al. | 475/116 |
| 2009/0280953 | A1 | 11/2009 | Nishimine et al. | |

FOREIGN PATENT DOCUMENTS

| | | |
|---|---|---|
| JP | 2001-248724 A | 9/2001 |
| JP | 2004-116734 A | 4/2004 |
| JP | 2008-144941 A | 6/2008 |

* cited by examiner

*Primary Examiner* — Edwin A Young
(74) *Attorney, Agent, or Firm* — Buchanan Ingersoll & Rooney PC

(57) ABSTRACT

A hydraulic pressure control apparatus includes frictional engagement elements which include a multiple use frictional engagement element applied in common when a first speed stage of the D range, the R range, the P position, and the N range are selected, a first hydraulic pressure supply source for engaging the multiple use frictional engagement element, a second hydraulic pressure supply source for engaging the multiple use frictional engagement element, and a switching mechanism switching a first state where a pressure is supplied from the first hydraulic pressure supply source when the P position or the N range is selected and a second state where the engaging hydraulic pressure is supplied from the second hydraulic pressure supply when the D range or the R range is selected. The switching mechanism switches the first state and the second state in accordance with a level of pressures outputted from a range selector valve.

10 Claims, 5 Drawing Sheets

| Shift position | Frictional engagement elements | | | | |
|---|---|---|---|---|---|
| | C1 | C2 | C3 | B1 | B2 |
| P | | | | | O |
| R | | | O | | O |
| N | | | | | O |
| 1st | O | | | | O |
| 2nd | O | | | O | |
| 3rd | O | | O | | |
| 4th | O | O | | | |
| 5th | | O | O | | |
| 6th | | O | | O | |

HYDRAULIC PRESSURE CONTROL APPARATUS FOR AUTOMATIC TRANSMISSION

CROSS REFERENCE TO RELATED APPLICATIONS

This application is based on and claims priority under 35 U.S.C. §119 to Japanese Patent Application 2009-237254, filed on Oct. 14, 2009, the entire content of which is incorporated herein by reference.

TECHNICAL FIELD

This disclosure relates to a hydraulic pressure control apparatus for an automatic transmission.

BACKGROUND DISCUSSION

A known hydraulic pressure control apparatus for an automatic transmission is disclosed in JP2001-248724A (hereinafter referred to as Patent reference 1). The known hydraulic pressure control apparatus disclosed in Patent reference 1 includes five frictional engagement elements including a brake B2 (i.e., refereed to as a low and reverse brake) shared by a first speed stage of a forward drive range (D range) and a reverse drive range (R range) (reverse shift stage). According to the hydraulic pressure control apparatus disclosed in Patent reference 1, four low pressure type linear solenoid valves and a pressure regulating valve are arranged for the five frictional engagement elements, and the linear solenoid valves and the pressure regulating valve are controlled for controlling a line pressure. Thus, hydraulic pressure control apparatus of Patent reference 1 is configured to achieve a gear skip shift with the reduced number of linear solenoid valves relative to the number of the frictional engagement elements by one.

JP2004-116734A (i.e., hereinafter referred to as Patent reference 2) discloses a known hydraulic pressure control apparatus for an automatic transmission which includes a brake B2 (i.e., refereed to as a low and reverse brake) shared by a first speed stage of a forward drive range (D range) and a reverse drive range (R range) (reverse shift stage). Further, according to the hydraulic pressure control apparatus disclosed in Patent reference 2, a linear solenoid valve is connected to the low and reverse brake via a shift valve which is controlled to switch by an on-off solenoid valve. The shift valve is configured to supply a hydraulic pressure from the linear solenoid valve to other frictional engagement elements other than the low and reverse brake.

JP2008-144941A (i.e., referred to as Patent reference 3) discloses a known hydraulic pressure control apparatus for an automatic transmission in which a linear solenoid valve for an engagement of a second clutch C2, which is another frictional engagement element, is connectable to a brake (low and reverse brake) B2, which is applied when selecting a first speed stage of a forward drive range (D range) and a reverse drive range (R range), to engage the low and reverse brake B2 when a park position (P position) or a neutral range (N range) is selected so that the brake (low and reverse brake) B2 does not have to be additionally engaged when the gear stage (gear selector position) is shifted from the P position or N range to the D range or R range (i.e., when a "garage shift" is executed).

According to the hydraulic pressure control apparatus disclosed in Patent reference 1, at a "garage shift" in which selected gear stage is shifted from a P position or a neutral range (N range) to the D range or the R range, it is required to newly establish engagements of two frictional engagement elements in order to establish the first speed stage of the D range and the R range. Thus, according to the construction disclosed in Patent reference 1, a time required for shifting is increased. Further, according to the construction disclosed in Patent reference 1, because it is required to increase a volume of an oil pump, which is a source of the hydraulic pressure, a loss of torque of the oil pump is increased and fuel economy is deteriorated.

According to the construction disclosed in Patent reference 2, because the hydraulic pressure is supplied to the low and reverse brake B2 via the shift valve which is controlled to switch by the on-off solenoid valve, structures of a hydraulic pressure circuit and controls of the apparatus is complicated.

According to the hydraulic pressure control apparatus disclosed in Patent reference 3, because the "garage shift" is required to be detected and the linear solenoid valve for the C2 clutch engagement is required to be controlled synchronizing to the garage shift, control logics are complicated.

A need thus exists for a hydraulic pressure control apparatus for an automatic transmission which is not susceptible to the drawback mentioned above.

SUMMARY

In light of the foregoing, the disclose provides a hydraulic pressure control apparatus for an automatic transmission, which includes a range selector valve outputting predetermined level of pressures for selecting one of a park position, a reverse drive range, a neutral range, and a forward drive range in accordance with the level of the outputted pressure, and plural frictional engagement elements for establishing a plurality of gear shift stages. The frictional engagement elements is controlled to engage or disengage by a hydraulic pressure and includes a multiple use frictional engagement element applied in common when a first speed stage of the forward drive range, the reverse drive range, the park position, and the neutral range are selected. The hydraulic pressure control apparatus further includes a first hydraulic pressure supply source supplying an engaging hydraulic pressure for engaging the multiple use frictional engagement element, a second hydraulic pressure supply source supplying an engaging hydraulic pressure for engaging the multiple use frictional engagement element, and a switching mechanism switching a first state where the engaging hydraulic pressure is supplied from the first hydraulic pressure supply source to the multiple use frictional engagement element when the park position or the neutral range is selected and a second state where the engaging hydraulic pressure is supplied from the second hydraulic pressure supply source to the multiple use frictional engagement element when the forward drive range or the reverse drive range is selected. The switching mechanism switches the first state and the second state in accordance with the level of pressures outputted from the range selector valve.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
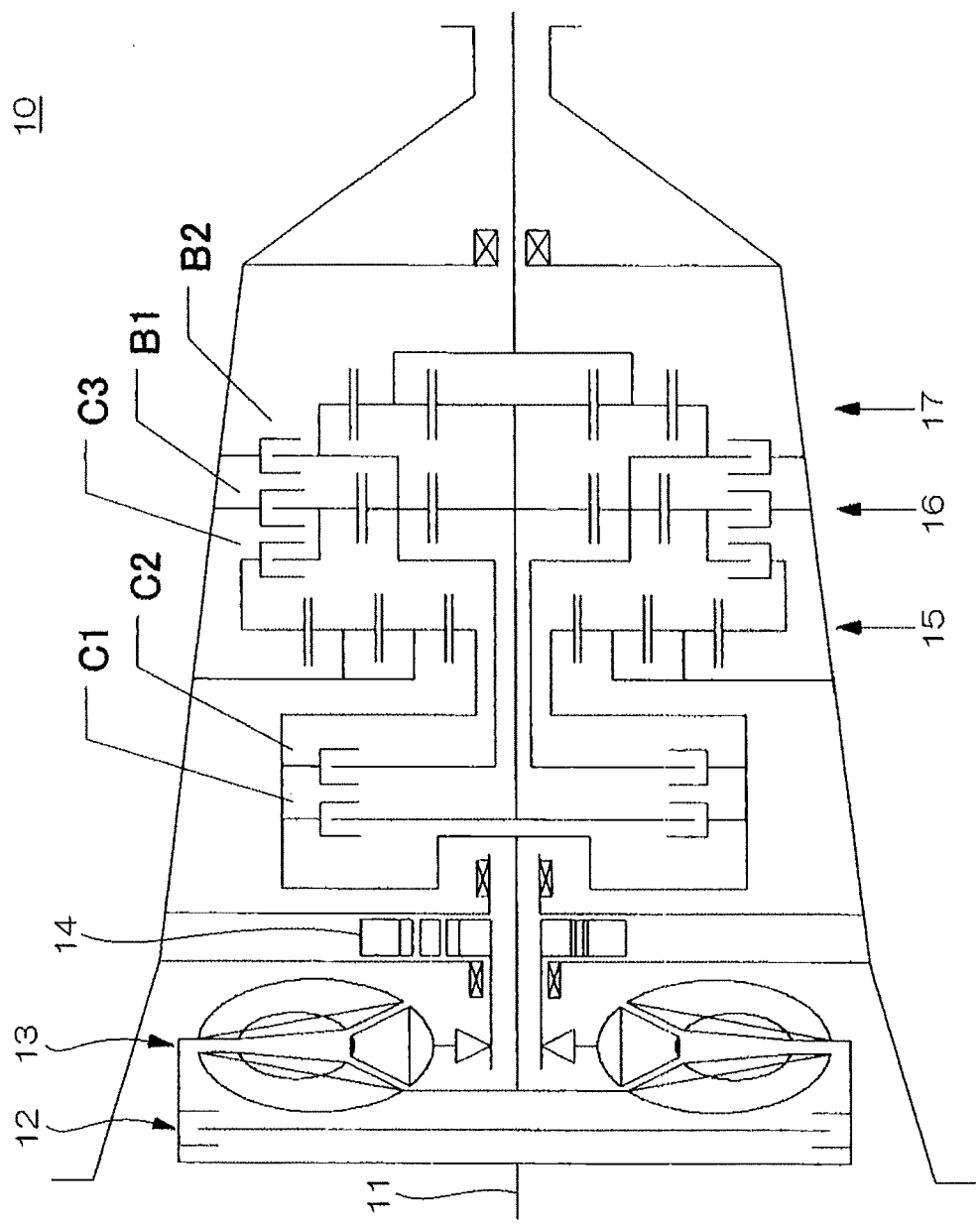
FIG. 1 shows a schematic view of an automatic transmission according to embodiments disclosed here.

Embodiments of a hydraulic pressure control apparatus for an automatic transmission will be explained with reference to illustrations of drawing figures as follows.

According to the embodiments, a first hydraulic pressure supply source corresponds to a line pressure for engaging a multiple use frictional engagement element when a park position (P position) or a neutral range (N range) is selected. A second hydraulic pressure supply source corresponds to a solenoid valve which is configured to linearly output a hydraulic pressure and to generate a hydraulic pressure for engaging the multiple use frictional engagement element when a first speed stage of a forward drive range (D range) or a reverse drive range (R range) is selected. According to the foregoing construction, by using the line pressure, constructions of members such as a switching mechanism are simplified, and a gear skip shift is readily executed between predetermined shift stages.

According to the embodiments, the hydraulic pressure control apparatus includes a shuttle valve which includes a first inlet port to which a forward drive range pressure (D range pressure) outputted from a range selector valve (gear selector valve) is inputted, a second inlet port to which a reverse drive range pressure (R range pressure) outputted from the range selector valve is inputted, and an outlet port which selectively outputs the D range pressure or the R range pressure to be supplied to a control input port of the switching mechanism. According to the foregoing construction, the construction of the hydraulic pressure control apparatus is assumed to be simple, and multipurpose parts with high reliability can be applied as components of the hydraulic pressure control apparatus, which enhances the reliability of the hydraulic pressure control apparatus.

According to the embodiments, the switching mechanism includes a plunger which is configured to be biased by the D range pressure or the R range pressure outputted from the range selector valve in a first direction and to be biased by the line pressure in a second direction, and to switch a first state and a second state by stroking in accordance with the level of the D range pressure or the R range pressure. According to the foregoing construction, the number of components for the hydraulic pressure control apparatus is reduced, and the hydraulic pressure control apparatus can be accommodated in a reduced space.

According to the embodiments, each of the plurality of frictional engagement elements other than the multiple use frictional engagement element is connected to a corresponding solenoid valve, which variably outputs the hydraulic pressure and supplies the engaging hydraulic pressure, one on one. According to the foregoing embodiment, a structure of a hydraulic pressure circuit and a control logic are simplified, a reliability of the hydraulic pressure control apparatus is enhanced, and the gear skip shift can be readily attained. The constructions of the embodiments may be applied to a hydraulic pressure control apparatus for an automatic transmission which is configured to selectively supply the hydraulic pressure to plural frictional engagement elements from a single solenoid valve as long as the advantages and effects of the disclosure are attained.

A first embodiment of the hydraulic pressure control apparatus for the automatic transmission will be explained with reference to FIGS. 1 to 3 as follows.

Figures 2, 3:
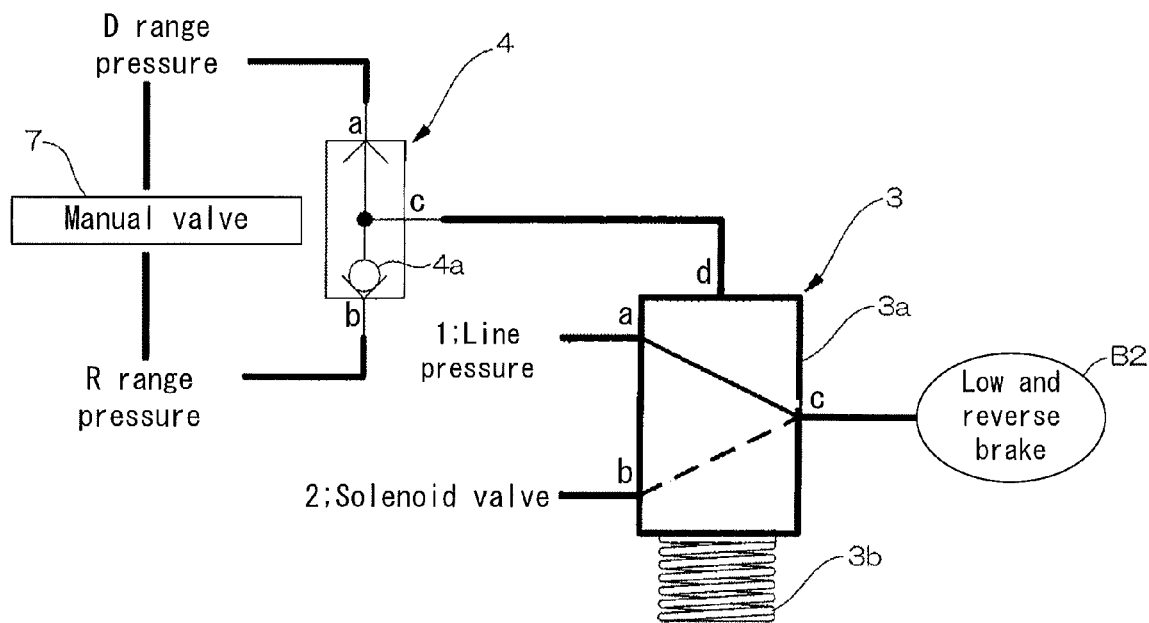
FIG. 2 is a chart indicating engagements of plural frictional engagement elements according to the automatic transmission shown in FIG. 1.
FIG. 3 is a schematic view of a hydraulic pressure control apparatus for an automatic transmission according to a first embodiment disclosed here.

Referring to FIGS. 1 and 2, an automatic transmission 10 includes a torque converter 13 connected to a crankshaft 11 to which an engine torque is inputted, a lock-up clutch 12 which is configured to directly connect the crankshaft 11 and a turbine runner of the torque converter 13, first to third clutches C1 to C3, a first brake B1, a second brake (second clutch) B2, and first to third planetary gear mechanisms 15 to 17. The first to third clutches C1 to C3 and the first and second brakes B1 and B2 are controlled based on a chart shown in FIG. 2 (or, see page 5, paragraphs [0013] to [0014] in Patent reference 2) to control engagements of predetermined members of the first to third planetary gear mechanisms 15 to 17. The first to third clutches C1 to C3 and the first and second brakes B1 and B2 are controlled by the hydraulic pressure control apparatus. As indicated in the chart shown in FIG. 2, the second clutch B2 corresponds to the multiple use frictional engagement element, that is, a low and reverse brake, which is applied when selecting a low range or reverse gear.

Constructions of a hydraulic pressure control apparatus for an automatic transmission which is applied to the automatic transmission shown in FIG. 1 will be explained as follows. The hydraulic pressure control apparatus is configured to select one of the P position, the R range, the N range, and the D range in accordance with the level of range pressure outputted from a range selector valve. Plural speed stages/gearshift stages are established by controlling hydraulic pressure to engage or disengage plural frictional engagement elements. The plural friction engagement elements include the multiple use frictional engagement element applied in common when a first speed stage of the forward drive range (D range), the reverse drive range (R range), the P position, and the N range are selected.

As illustrated in FIG. 3, the hydraulic pressure control apparatus for the automatic transmission according to the first embodiment includes a manual valve (i.e., serving as the range selector valve) 7, a line pressure 1, a solenoid valve 2, and a switching valve (i.e., serving as a switching mechanism) 3. The manual valve 7 outputs a P range pressure (park position pressure), an R range pressure (reverse drive range pressure), an N range pressure (neutral range pressure), and a D range pressure (drive range pressure) for establishing the P position, the R range, the N range, and the D range, of the transmission respectively. The line pressure 1 serves as a first hydraulic pressure supply source supplying the hydraulic pressure for engaging the multiple use frictional engagement element (i.e., serving as the second brake, or low and reverse brake) B2. The solenoid valve 2 serves as a second hydraulic pressure supply source which is configured to supply the hydraulic pressure for engaging the multiple use frictional engagement element B2. The switching valve 3 is configured to switch a first state where the hydraulic pressure is supplied from the line pressure 1 to the multiple use frictional engagement element B2 for engaging the multiple use frictional engagement element B2 when selecting the P position or the N range, and a second state where the hydraulic pressure is supplied from the solenoid valve 2 to the multiple use frictional engagement element B2 for engaging the multiple use frictional engagement element B2 when selecting the D range or the R range.

More particularly, the switching valve 3 includes a port a to which the line pressure 1 is inputted, a port b to which the hydraulic pressure supplied from the solenoid valve 2 is inputted, a port c which outputs the hydraulic pressure from either the line pressure 1 or the solenoid valve 2 to the multiple use frictional engagement element B2, a port d to which the hydraulic pressure is inputted to the switching valve 3 for controlling the switching valve 3, and a plunger 3a which is biased by the hydraulic pressure inputted to the port d in a first direction and is biased by a return spring 3b in a second direction.

Further, according to the first embodiment, the hydraulic pressure control apparatus for the automatic transmission includes a shuttle valve 4 for controlling the switching valve 3. The shuttle valve 4 includes a port a (i.e., serving as a first inlet port) to which the D range pressure outputted by the manual valve 7 is inputted, a port b (i.e., serving as a second inlet port) to which the R range pressure outputted from the manual valve 7 is inputted, and a port c (i.e., serving as an outlet port) for supplying the control hydraulic pressure to the port d (control input port) of the switching valve 3 by selectively outputting the D range pressure or the R range pressure in response to the movement of a check ball 4a which receives the D range pressure or the R range pressure.

The line pressure 1 serving as the first hydraulic pressure supply source to the switching valve 3 may be generated by an oil pump 14 and a regulator valve, or the like. The line pressure 1 corresponds to a reference pressure which is applied in known hydraulic pressure control apparatuses for automatic transmissions. The line pressure 1 serves as a hydraulic pressure for engaging the multiple use frictional engagement element B2 when the P position or the N range is selected.

The solenoid valve 2 serving as a second hydraulic pressure supply source to the switching valve 3 linearly outputs the hydraulic pressure. The solenoid valve 2 is configured to generate the hydraulic pressure for engaging the multiple use frictional engagement element B2 when the first speed stage of the D range or the R range is selected. Other elements other than the solenoid valve 2 may be applied as the second hydraulic pressure supply source.

Operations of the hydraulic pressure control apparatus for the automatic transmission at a "garage shift" which is when shifting from the P position or the N range to the R range or D range, or vice versa, according to the first embodiment will be explained as follows.

As shown in FIG. 3, the D range pressure or the R range pressure outputted from the manual valve 7 is supplied to the switching valve 3 via the shuttle valve 4 to control the switching valve 3, and the control hydraulic pressure operates the switching valve 3 in a direction to compress the return spring 3b.

A first state where the P position or the N range is established will be explained as follows. When the P position or the N range is selected, because the D range pressure or the R range pressure is not supplied to the switching valve 3 via the shuttle valve 4, the return spring 3b is expanded to move the plunger 3a in the second direction to establish a communication between the port a and the port c of the switching valve 3. Thus, the line pressure 1 is supplied to the multiple use frictional engagement element B2 to engage the multiple use frictional engagement element B2, thus establishing the P position or the N range as shown in FIG. 2.

A second state where the D range or the R range is established will be explained as follows. When the D range or the R range is selected from the first state where the P position or the N range is selected, the D range pressure or the R range pressure is outputted from the manual valve 7 to supply the hydraulic pressure to the switching valve 3 for controlling the switching valve 3. In those circumstances, the plunger 3a of the switching valve 3 moves in a direction to compress the return spring 3b to establish a communication between the port b and the port c of the switching valve 3, and thus to establish the second state where the hydraulic pressure from the solenoid valve 2 can be supplied to the multiple use frictional engagement element B2. In a case where it is commanded to select the first speed stage in the D range or the R range, the solenoid valve 2 is operated to supply the hydraulic pressure to the multiple use frictional engagement element B2 to engage the multiple use frictional engagement element B2 to establish the first speed stage of the D range or the R range.

Advantages and effects of the constructions of the hydraulic pressure control apparatus according to the first embodiment will be explained as follows. First, according to the hydraulic pressure control apparatus of the first embodiment, because the engaging hydraulic pressure is continuously supplied to the multiple use frictional engagement element B2 to continuously engage the multiple use frictional engagement element B2 during the "garage shift" where shifting from the P range or the N range to the R range or D range, or vice versa, the P range, the N range, the R range, or the first speed stage of the D range is established by supplying the engaging hydraulic pressure to one additional frictional engagement element (a first clutch C1 or a third clutch C3 shown in FIG. 2). Second, according to the hydraulic pressure control apparatus of the first embodiment, because a switching control of the first and second hydraulic pressure supply sources (i.e., line pressure 1 and the solenoid valve 2) is executed to supply the hydraulic pressure to the multiple use frictional engagement element B2 in response to the level of the pressure outputted from the manual valve 7, the construction of the switching valve 3 is simplified, and a control logic for supplying the engaging hydraulic pressure to the multiple use frictional engagement element B2 is simplified. Third, according to the hydraulic pressure control apparatus of the first embodiment, because the line pressure is applied as the first hydraulic pressure supply source to the switching valve 3 to supply the engaging hydraulic pressure to the multiple use frictional engagement element B2 and the solenoid valve 2 is applied as the second hydraulic pressure supply source to the switching valve 3 to supply the engaging hydraulic pressure to the multiple use frictional engagement element B2, a gear skip shift is readily executed by the solenoid valve 2 between predetermined speed stages at the D range. Fourth, according to the hydraulic pressure control apparatus of the first embodiment, because a predetermined shift range or speed stage is attained by supplying the engaging hydraulic pressure to one additional frictional engagement element, a volume of the oil pump 14 (see FIG. 1) which is the supply source of the oil can be reduced, a loss of torque at the oil pump is reduced, and the fuel economy is enhanced. Fifth, according to the hydraulic pressure control apparatus of the first embodiment, because general-purpose parts with high reliability can be applied as the switching valve 3 or the shuttle valve 4, the reliability of the hydraulic pressure control apparatus is enhanced.

Figure 4:
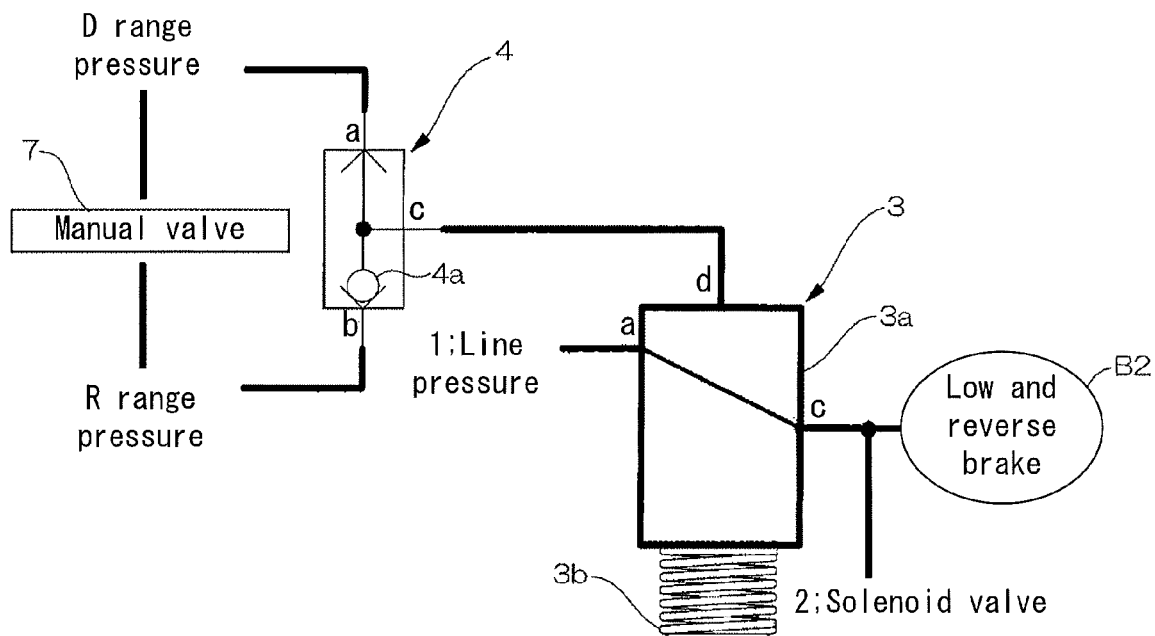
FIG. 4 is a schematic view of a hydraulic pressure control apparatus for an automatic transmission according to a second embodiment disclosed here.

A hydraulic pressure control apparatus according to a second embodiment which is applied to the automatic transmission shown in FIG. 1 will be explained with reference to FIG. 4 as follows. The hydraulic pressure control apparatus of the second embodiment is a modified example of the first embodiment. Differences of the second embodiment from the first embodiment will be explained hereinafter, and the explanations for the common constructions to the first embodiment will not be repeated.

As shown in FIG. 3, the solenoid valve 2 is connected to the port b of the switching valve 3 according to the first embodiment. On the other hand, according to the second embodiment, the solenoid valve 2 is connected to a hydraulic pressure path provided between the port c of the switching valve 3 and the multiple use frictional engagement element B2.

When the D range or the R range is selected, the line pressure 1 from the port a of the switching valve 3 is not supplied to the multiple use frictional engagement element B2, and the multiple use frictional engagement element B2 is controlled by the solenoid valve 2. When the first speed stage of the D range or the R range is selected at the "garage shift" shifting the gear from the P position or the N range to the R range or D range, or vice versa, the engaging hydraulic pressure is supplied from the solenoid valve 2 to the multiple use frictional engagement element B2.

A hydraulic pressure control apparatus according to a third embodiment which is applied to the automatic transmission shown in FIG. 1 will be explained with reference to FIG. 5 as follows. The hydraulic pressure control apparatus is configured to select one of the P position, the R range, the N range, and the D range in accordance with the level of range pressure outputted from the range selector valve. The plural speed stages/gearshift stages are established by controlling hydraulic pressure to engage or disengage plural frictional engagement elements. The plural friction engagement elements include the multiple use frictional engagement element applied in common when a first speed stage of the forward drive range (D range), the reverse drive range (R range), the P position, and the N range are selected.

Figure 5:
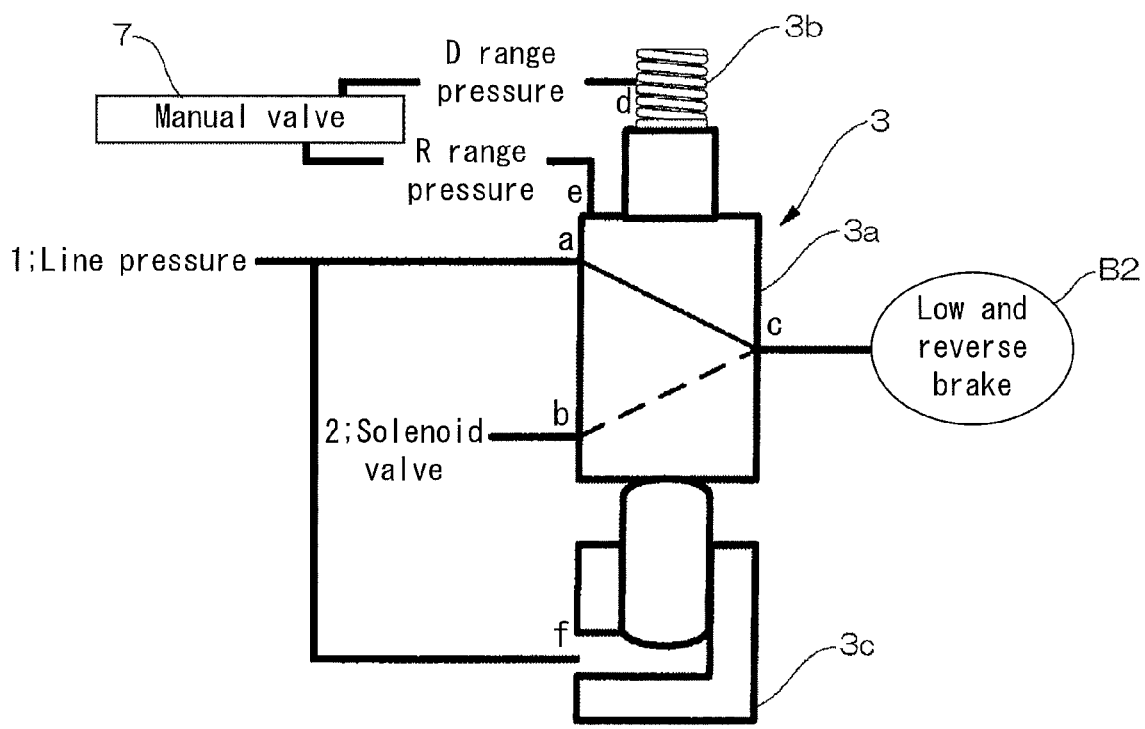
FIG. 5 is a schematic view of a hydraulic pressure control apparatus for an automatic transmission according to a third embodiment disclosed here.

As illustrated in FIG. 5, the hydraulic pressure control apparatus for the automatic transmission according to the third embodiment includes the manual valve (i.e., serving as the range selector valve) 7, the line pressure 1, the solenoid valve 2, and the switching valve (i.e., serving as a switching mechanism) 3. The manual valve 7 outputs the P range pressure, the R range pressure, the N range pressure, and the D range pressure for establishing the P position, the R range, the N range, and the D range, respectively. The line pressure 1 serves as a first hydraulic pressure supply source supplying the hydraulic pressure for engaging the multiple use frictional engagement element (i.e., serving as a second brake, or Low and reverse brake) B2. The solenoid valve 2 serves as a second hydraulic pressure supply source which is configured to supply the hydraulic pressure for engaging the multiple use frictional engagement element B2. The switching valve 3 is configured to switch a first state where the hydraulic pressure is supplied from the line pressure 1 to the multiple use frictional engagement element B2 for engaging thereof when selecting the P position or the N range, and a second state where the hydraulic pressure is supplied from the solenoid valve 2 to the multiple use frictional engagement element B2 for engaging thereof when selecting the D range or the R range.

More particularly, the switching valve 3 includes the port a to which the line pressure 1 is inputted, the port b to which the hydraulic pressure supplied from the solenoid valve 2 is inputted, the port c which outputs the hydraulic pressure from either the line pressure 1 or the solenoid valve 2 to the multiple use frictional engagement element B2, a port d to which the D range pressure is inputted, a port e to which the R range pressure is inputted, a port f to which the line pressure 1 is inputted, and the plunger 3a which is biased by the D range pressure or the R range pressure (control hydraulic pressure) inputted to the port d or the port e in a first direction and is biased by the return spring 3b in the first direction, and is biased by the line pressure inputted to the port f in a second direction. Accordingly, the plunger 3a is movable relative to a sleeve 3c. The line pressure 1 is inputted to the sleeve 3c via the port f to push the return spring 3b in a compressing direction. Depending on whether a combined force of the return spring 3b and the D range pressure or the R range pressure exceeds the level of the line pressure 1, the communications between the port a and the port c and between the port b and port c are switched.

The line pressure 1 serving as the first hydraulic pressure supply source to the switching valve 3 may be generated by the oil pump 14 and the regulator valve, or the like. The line pressure 1 corresponds to a reference pressure which is applied in known hydraulic pressure control apparatuses for automatic transmissions. The line pressure 1 serves as a hydraulic pressure for engaging the multiple use frictional engagement element B2 (i.e., engaging hydraulic pressure) when the P position or the N range is selected.

The solenoid valve 2 serving as a second hydraulic pressure supply source to the switching valve 3 linearly outputs the hydraulic pressure. The solenoid valve 2 is configured to generate the hydraulic pressure for engaging the multiple use frictional engagement element B2 when the first speed stage of the D range or the R range is selected. Other elements other than the solenoid valve 2 may be applied as the second hydraulic pressure supply source.

Operations of the hydraulic pressure control apparatus for the automatic transmission at a "garage shift" which is when shifting from the P position or the N range to the R range or D range, or vice versa, according to the third embodiment will be explained as follows.

As shown in FIG. 5, the D range pressure or the R range pressure outputted from the manual valve 7 is directly supplied to the switching valve 3 as the control hydraulic pressure to control the switching valve 3, and the control hydraulic pressure operates the switching valve 3 in a direction to expand the return spring 3b.

A first state where the P range or the N range is established will be explained as follows. When the P range or the N range is selected, because the D range pressure or the R range pressure is not supplied to the switching valve 3 from the manual valve 7, the plunger 3a is moved by the line pressure 1 in a direction to compress the return spring 3b to establish a communication between the port a and the port c of the switching valve 3. Thus, the line pressure 1 is supplied to the multiple use frictional engagement element B2 to engage the multiple use frictional engagement element B2, thus establishing the P range or the N range as shown in FIG. 2.

A second state where the D range or the R range is established will be explained as follows. When the D range or the R range is selected from the first state where the P range or the N range is selected, the D range pressure or the R range pressure is outputted from the manual valve 7 to move the plunger 3a of the switching valve 3 in the direction to expand the return spring 3b. In those circumstances, a communication between the port b and the port c of the switching valve 3 is established to establish the second state where the hydraulic pressure from the solenoid valve 2 can be supplied to the multiple use frictional engagement element B2. In a case where it is commanded to select the first speed stage in the D range or the R range, the solenoid valve 2 is operated to supply the engaging hydraulic pressure to the multiple use frictional engagement element B2 to engage the multiple use frictional engagement element B2 thus to establish the first speed stage of the D range or the R range.

Advantages and effects of the constructions of the hydraulic pressure control apparatus according to the third embodiment will be explained as follows. First, according to the hydraulic pressure control apparatus of the third embodiment, because the engaging hydraulic pressure is continuously supplied to the multiple use frictional engagement element B2 to continuously engage the multiple use frictional engagement element B2 during the "garage shift" where shifting from the P position or the N range to the R range or D range, or vice versa, the P position, the N range, the R range, or the first speed stage of the D range is established by supplying the engaging hydraulic pressure to one additional frictional engagement element (the first clutch C1 or the third clutch C3 shown in FIG. 2). Second, according to the hydraulic pressure control apparatus of the third embodiment, because a switching control of the first and second hydraulic pressure supply sources (i.e., line pressure 1 and the solenoid valve 2) is executed to supply the hydraulic pressure to the multiple use frictional engagement element B2 in response to the level of the pressure outputted from the manual valve 7, the construction of the switching valve 3 is simplified, and a control logic for supplying the engaging hydraulic pressure to the multiple use frictional engagement element B2 is simplified. Third, according to the hydraulic pressure control apparatus of the third embodiment, because the line pressure 1 is applied as the first hydraulic pressure supply source to the switching valve 3 to supply the engaging hydraulic pressure to the multiple use frictional engagement element B2 and the solenoid valve 2 is applied as the second hydraulic pressure supply source to the switching valve 3 to supply the engaging hydraulic pressure to the multiple use frictional engagement element B2, a gear skip shift is readily executed by the solenoid valve 2 between predetermined speed stages at the D range. Fourth, according to the hydraulic pressure control apparatus of the third embodiment, because a predetermined shift range or speed stage is attained by supplying the engaging hydraulic pressure to one additional frictional engagement element, a volume of the oil pump 14 (see FIG. 1) which is the supply source of the oil can be reduced, a loss of torque at the oil pump 14 is reduced, and the fuel economy is enhanced. Fifth, according to the hydraulic pressure control apparatus of the third embodiment, by changing the components of the hydraulic pressure control apparatus (i.e., the construction of the switching valve 3 is changed in place of the shuttle valve 4), time required for machining is reduced, thus reducing manufacturing costs.

Figure 6:
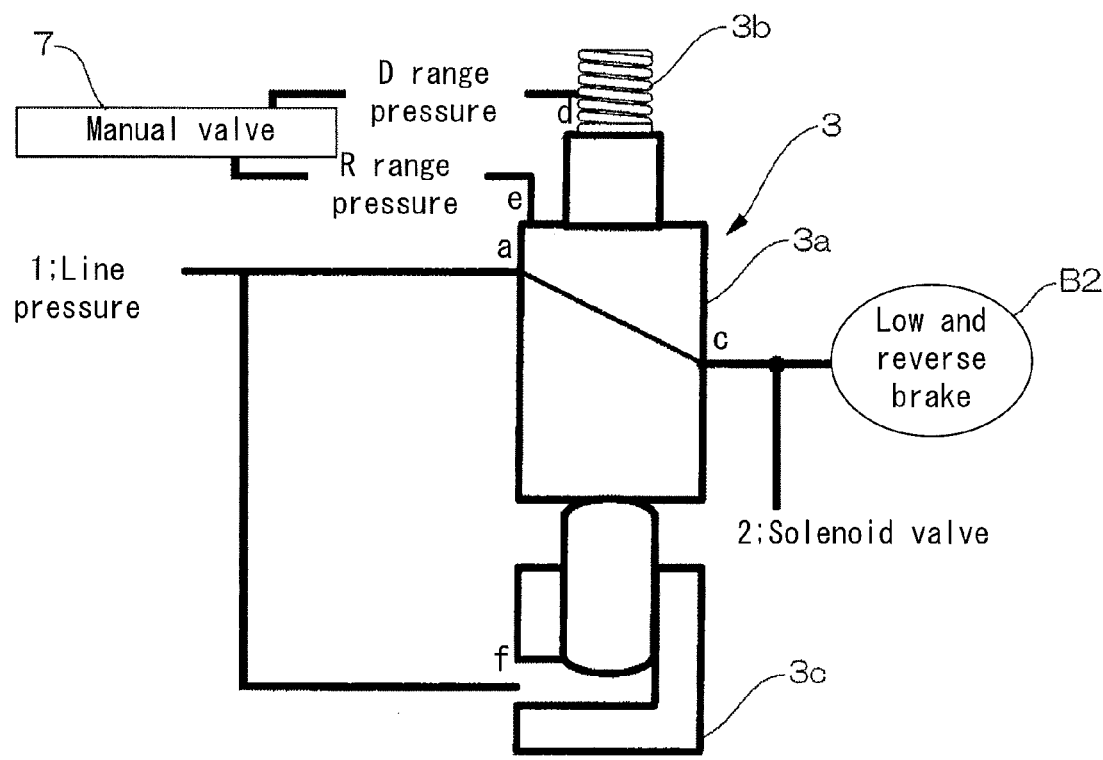
FIG. 6 is a schematic view of a hydraulic pressure control apparatus for an automatic transmission according to a fourth embodiment disclosed here.

A hydraulic pressure control apparatus according to a fourth embodiment which is applied to the automatic transmission shown in FIG. 1 will be explained with reference to FIG. 6 as follows. The hydraulic pressure control apparatus of the fourth embodiment is a modified example of the third embodiment. Differences of the fourth embodiment from the third embodiment will be explained hereinafter, and the explanations for the common constructions to the third embodiment will not be repeated.

As shown in FIG. 5, the solenoid valve 2 is connected to the port b of the switching valve 3 according to the third embodiment. On the other hand, according to the fourth embodiment, the solenoid valve 2 is connected to a hydraulic pressure path provided between the port c of the switching valve 3 and the multiple use frictional engagement element B2.

When the D range or the R range is selected, the line pressure 1 from the port a of the switching valve 3 is not supplied to the multiple use frictional engagement element B2, and the multiple use frictional engagement element B2 is controlled by the solenoid valve 2. When the first speed stage of the D range or the R range is selected at the "garage shift" shifting the gear from the P position or the N range to the R range or D range, or vice versa, the engaging hydraulic pressure is supplied from the solenoid valve 2 to the multiple use frictional engagement element B2.

Figure 7:
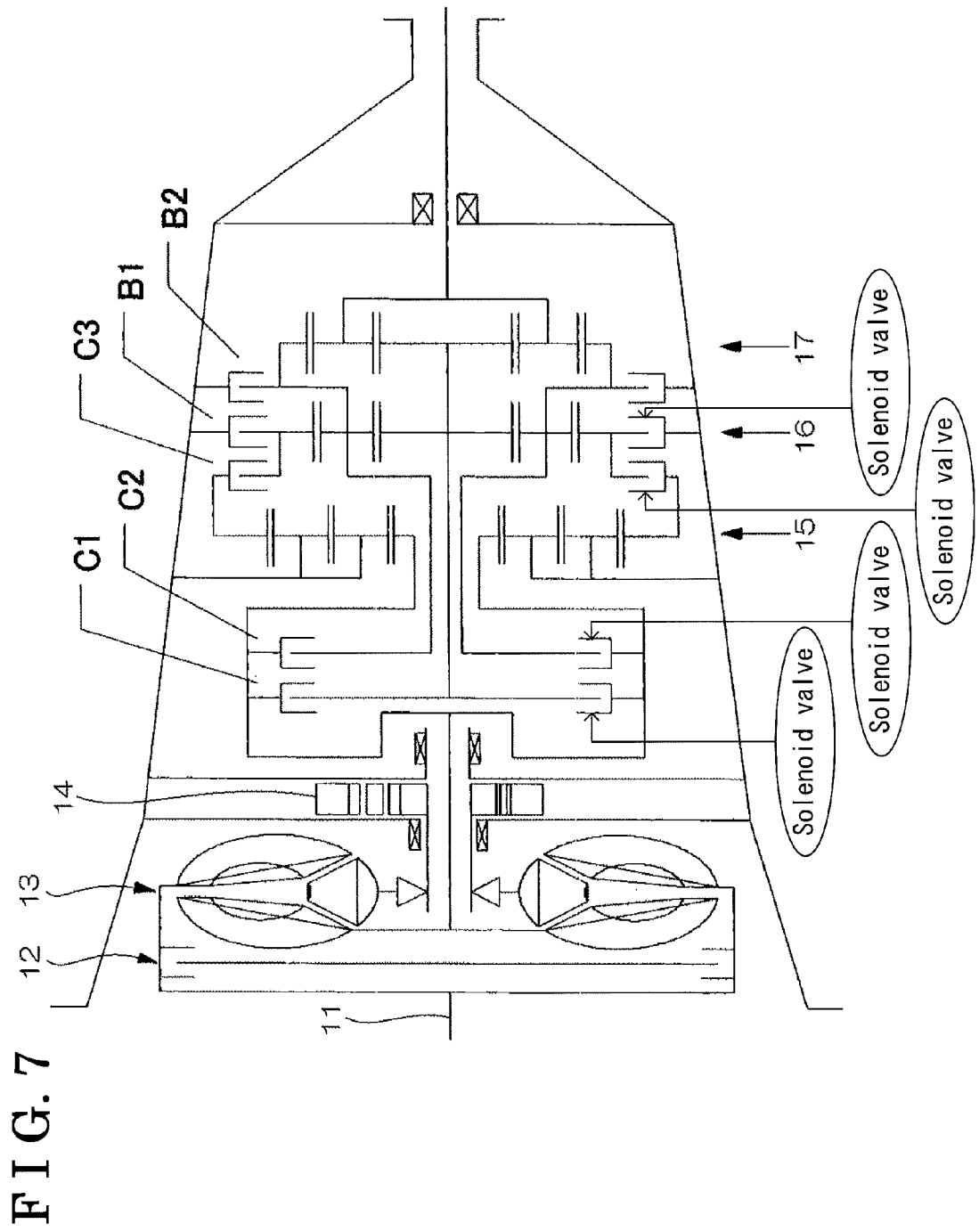
FIG. 7 is a schematic view of the automatic transmission which includes solenoid valves connected to frictional engagement elements according to the embodiments disclosed here.

As shown in FIG. 7, according to the embodiments, solenoid valves for outputting variable hydraulic pressures to supply engaging hydraulic pressures may be provided for the frictional engagement elements C1, C2, C3, and B1 other than the multiple use frictional engagement element B2. The solenoid valve may be provided for each of the frictional engagement elements C1, C2, C3, and B1 one on one. According to the foregoing construction, a structure of hydraulic pressure circuit and a control logic are simplified, a reliability of the hydraulic pressure control apparatus is enhanced, and the gear skip shift can be readily attained. The constructions of the embodiments may be applied to a hydraulic pressure control apparatus for an automatic transmission which is configured to selectively supply the hydraulic pressure to plural frictional engagement elements from a single solenoid valve as long as the advantages and effects of the disclosure are attained.

According to the embodiment, the automatic transmission to which the hydraulic pressure control apparatus of the disclosure is applied includes the multiple use frictional engagement element B2 which is used when selecting the first speed stage of the D range, the R range, the P position, and the N range. Accordingly, at the "garage shift" where the gear is shifted from the P position or the N range to the D range or the R range, the predetermined shift range or the speed stage is attained by supplying the engaging hydraulic pressure to one additional frictional engagement element, a time required for shifting gears is shortened.

According to the embodiment, because a switching control of the hydraulic pressure supply source to the multiple use frictional engagement element B2 is executed in accordance with the level of the pressure outputted from the manual valve (i.e., range selector valve) 7, a structure of a hydraulic pressure circuit such as the switching mechanism (switching valve) 3 (hardware) is simplified and a control logic for controlling the engaging hydraulic pressure supplied to the multiple use frictional engagement element (low and reverse brake) B2 is simplified.

According to the embodiment, because the line pressure 1 is applied as the first hydraulic pressure supply source to the switching mechanism (switching valve) 3 which supplies the engaging hydraulic pressure to the multiple use frictional engagement element B2, the gear skip shift can be readily executed when shifting between the predetermined speed stages.

According to the embodiment, because a predetermined shift range or speed stage is attained by supplying the engaging hydraulic pressure to one additional frictional engagement element at the "garage shift" shifting the gear from the P position or the N range to the R range or D range, or vice versa, a volume of the oil pump 14 which is the supply source of the oil can be reduced, a loss of torque at the oil pump 14 is reduced, and the fuel economy is enhanced.

According to the embodiments, the hydraulic pressure control apparatus for the automatic transmission, which shortens a time required for shifting gears at the "garage shift"

shifting the gear from the P position or the N range to the R range or D range, or vice versa, with the simple constructions and controls, is provided.

According to the embodiments, the first hydraulic pressure supply source corresponds to the line pressure 1 for engaging the multiple use frictional engagement element B2 when the park position or the neutral range is selected, and the second hydraulic pressure supply source corresponds to the solenoid valve 2 configured to linearly output the hydraulic pressure for generating the engaging hydraulic pressure for engaging the multiple use frictional engagement element B2 when the first speed stage of the forward drive range or the reverse drive range is selected.

According to the embodiments, the hydraulic pressure control apparatus for the automatic transmission includes the shuttle valve 4 including the port a (first inlet port) to which a drive range pressure outputted from the manual valve (range selector valve) 7 is inputted, the port b (second inlet port) to which a reverse drive range pressure outputted from the manual valve (range selector valve) 7 is inputted, and the port c (outlet port) selectively outputting the drive range pressure or the reverse drive range pressure to be supplied to the port d (control input port) of the switching valve 3.

According to the embodiments, the switching valve (switching mechanism) 3 includes the plunger 3a configured to be biased in a first direction by the drive range pressure or the reverse drive range pressure outputted from the manual valve (range selector valve) 7 and in a second direction by the line pressure 1, the plunger 3a switching the first state and the second state by moving in response to a level of the drive range pressure or the reverse drive range pressure.

According to the embodiments, each of the plural frictional engagement elements C1, C2, C3, B1 other than the multiple use frictional engagement element B2 is connected to the corresponding solenoid valve one on one variably outputting the hydraulic pressure and supplying the engaging hydraulic pressure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic pressure control apparatus for an automatic transmission, comprising:
a range selector valve outputting predetermined level of pressures for selecting one of a park position, a reverse drive range, a neutral range, and a forward drive range in accordance with the level of the outputted pressure;
a plurality of frictional engagement elements for establishing a plurality of gear shift stages, the frictional engagement elements being controlled to engage or disengage by a hydraulic pressure and including a multiple use frictional engagement element applied in common when a first speed stage of the forward drive range, the reverse drive range, the park position, and the neutral range are selected;
a first hydraulic pressure supply source supplying an engaging hydraulic pressure for engaging the multiple use frictional engagement element;
a second hydraulic pressure supply source supplying an engaging hydraulic pressure for engaging the multiple use frictional engagement element; and
a switching mechanism switching a first state where the engaging hydraulic pressure is supplied from the first hydraulic pressure supply source to the multiple use frictional engagement element when the park position or the neutral range is selected and a second state where the engaging hydraulic pressure is supplied from the second hydraulic pressure supply source to the multiple use frictional engagement element when the forward drive range or the reverse drive range is selected, the switching mechanism switching the first state and the second state in accordance with the level of pressures outputted from the range selector valve.

2. The hydraulic pressure control apparatus for the automatic transmission according to claim 1, wherein
the first hydraulic pressure supply source corresponds to a line pressure for engaging the multiple use frictional engagement element when the park position or the neutral range is selected; and
the second hydraulic pressure supply source corresponds to a solenoid valve configured to linearly output the hydraulic pressure for generating the engaging hydraulic pressure for engaging the multiple use frictional engagement element when the first speed stage of the forward drive range or the reverse drive range is selected.

3. The hydraulic pressure control apparatus for the automatic transmission according to claim 2 further comprising:
a shuttle valve including a first inlet port to which a drive range pressure outputted from the range selector valve is inputted, a second inlet port to which a reverse drive range pressure outputted from the range selector valve is inputted, and an outlet port selectively outputting the drive range pressure or the reverse drive range pressure to be supplied to a control input port of the switching valve.

4. The hydraulic pressure control apparatus for the automatic transmission according to claim 2, wherein the switching mechanism includes a plunger configured to be biased in a first direction by the drive range pressure or the reverse drive range pressure outputted from the range selector valve and in a second direction by a line pressure, the plunger switching the first state and the second state by moving in response to a level of the drive range pressure or the reverse drive range pressure.

5. The hydraulic pressure control apparatus for the automatic transmission according to claim 2, wherein each of the plurality of frictional engagement elements other than the multiple use frictional engagement element is connected to a corresponding solenoid valve one on one variably outputting the hydraulic pressure and supplying the engaging hydraulic pressure.

6. The hydraulic pressure control apparatus for the automatic transmission according to claim 1 further comprising:
a shuttle valve including a first inlet port to which a drive range pressure outputted from the range selector valve is inputted, a second inlet port to which a reverse drive range pressure outputted from the range selector valve is inputted, and an outlet port selectively outputting the drive range pressure or the reverse drive range pressure to be supplied to a control input port of the switching valve.

7. The hydraulic pressure control apparatus for the automatic transmission according to claim 6, wherein each of the plurality of frictional engagement elements other than the multiple use frictional engagement element is connected to a corresponding solenoid valve one on one variably outputting the hydraulic pressure and supplying the engaging hydraulic pressure.

8. The hydraulic pressure control apparatus for the automatic transmission according to claim 1, wherein the switching mechanism includes a plunger configured to be biased in a first direction by the drive range pressure or the reverse drive range pressure outputted from the range selector valve and in a second direction by a line pressure, the plunger switching the first state and the second state by moving in response to a level of the drive range pressure or the reverse drive range pressure.

9. The hydraulic pressure control apparatus for the automatic transmission according to claim 8, wherein each of the plurality of frictional engagement elements other than the multiple use frictional engagement element is connected to a corresponding solenoid valve one on one variably outputting the hydraulic pressure and supplying the engaging hydraulic pressure.

10. The hydraulic pressure control apparatus for the automatic transmission according to claim 1, wherein each of the plurality of frictional engagement elements other than the multiple use frictional engagement element is connected to a corresponding solenoid valve one on one variably outputting the hydraulic pressure and supplying the engaging hydraulic pressure.

\* \* \* \* \*